Figure 1:
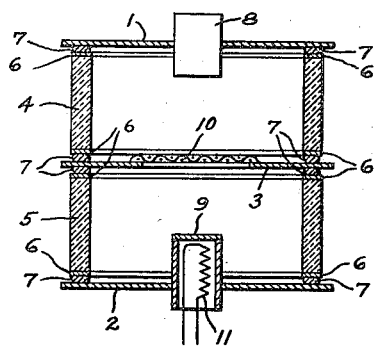

Jan. 26, 1954   H. J. NOLTE   2,667,432
METALIZED CERAMIC
Original Filed Jan. 14, 1947

Inventor:
Henry J. Nolte,
by His Attorney.

Patented Jan. 26, 1954

2,667,432

UNITED STATES PATENT OFFICE 2,667,432

METALIZED CERAMIC

Henry J. Nolte, Schenectady, N. Y., assignor to General Electric Company, a corporation of New York Original application January 14, 1947, Serial No. 722,029. Divided and this application January 21, 1949, Serial No. 71,893

2 Claims. (Cl. 117—123)

This invention relates to metalized ceramics and to seals between a metalized ceramic and a second ceramic or a metal. This application is a division of my application Serial No. 722,029, filed January 14, 1947, now abandoned, and assigned to the assignee of this invention.

In the past it has been difficult to join ceramic materials together or to metal because it has been difficult to find a bonding metal which adheres closely enough to the surface of the ceramic to provide a tight joint, particularly a joint sufficiently tight to withstand a vacuum. Many attempts have been made to use ceramics for these purposes but the lack of a satisfactory bonding method has prevented a large scale application to such devices as hermetically sealed envelopes for electrical apparatus. It is accordingly an important object of the present invention to provide an improved seal and method of metalizing ceramics.

Further advantages peculiar to the art of electron discharge devices, especially those designed for usage in connection with high frequency electrical fields, arise from the fact that ceramics in general exhibit properties not possessed by materials, such as glass, now in use in such devices. Many ceramics could, therefore, advantageously be substituted for such materials in numerous tube constructions now known if ceramic to metal seals of suitable mechanical strength and hermetic characteristics were available. Among the properties of ceramics advantageous in this art may be mentioned the fact that certain ceramics have but a small fraction of the dielectric loss characteristics of glass (less than 25% of the dielectric loss of the best glasses in the case of certain magnesium silicate ceramics), the fact that high temperatures softening characteristics of ceramics permit the use of substantially greater temperatures during the manufacturing operations as well as during usage of the devices for the purpose for which designed; the fact that certain ceramics can withstand more rapid heating and cooling without cracking; the fact that the absence of residual stresses in ceramics after manufacture obviates annealing treatment and shrinkage from residual stresses; the fact that the high specific resistance characteristics of ceramics allow increased operating temperatures with less danger of electrolysis in the seals; the fact that seals may be made in other than oxidizing atmospheres which are required by present glass to metal techniques; the fact that the absence of oxides, always formed during sealing with glass, tends to minimize residual gas problems in the envelope with which the seal is associated; and the fact that ceramics may be subjected to inexpensive grinding and machining operations which will produce precisely dimensioned parts.

Accordingly, it is the general object of this invention to provide a sealing construction and method which will be suitable for all such applications as the foregoing and which will exhibit the mentioned advantages.

It is a further object of the invention to provide a method of securing ceramics to metals or ceramics to ceramics which is simple in practice and which provides an hermetically sealed joint of great strength and rigidity.

It is a further and more specific object of the invention to provide an improved seal for hermetically sealed envelopes such as envelopes of electron discharge devices.

It is another object of my invention to provide an improved method of metalizing ceramic materials.

It is a still further object of the invention to provide an improved envelope for high frequency electron discharge devices wherein a low dielectric loss, temperature resistant ceramic is substituted for glass or like parts hitherto known in the art.

It is a still further object of the invention to provide a method of coating a ceramic with a metallic coating including a quantity of manganese.

Figure 3:
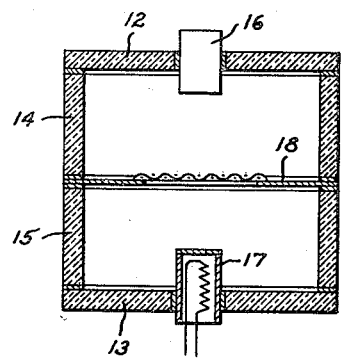
Figure 4:
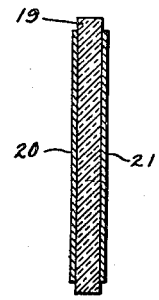

The features of the invention desired to be protected are pointed out in the appended claims. The invention itself, together with further objects and advantages thereof, will best be understood from the following description when taken in connection with the accompanying drawing in which Figs. 1, 2, and 3 show illustrative embodiments of the invention in an hermetically sealed envelope of an electron discharge device, while Fig. 4 illustrates a ceramic member with a metalized surface formed in accordance with the invention.

The basic principle of the invention arises from my discovery that certain ceramic surfaces may be metallized with strongly adherent metallic coatings if metallic powders or equivalent mixtures containing a suitable proportion of manganese be juxtaposed to the ceramic surface and the assembly be heated in a reducing atmosphere, such as hydrogen or in vacuum. Apparently, this advantageous effect is brought about by the fact that manganese, especially under high temperature conditions, will exhibit a strong affinity for numerous substances such as component elements of the ceramic. Ceramic members having such metallized surfaces may be affixed to like ceramic members or to metallic members by solder applied to the metallized portion. Ceramic to ceramic or ceramic to metal bonding techniques employing these principles will be found to be advantageous in many respects, such as relative simplicity, low cost and ease of control of the necessary apparatus employed in manufacture. Moreover, they will be particularly advantageous in that they are similar to and, therefore, readily adaptable to conventional factory apparatus and practices already in general use in the art.

Figure 2:
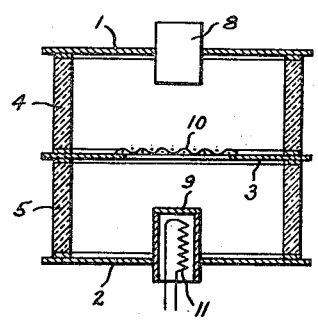

As one exemplary employment of the above principles, there is shown in Figs. 1 and 2 of the drawing a cross section of an electron discharge device comprising disk-shaped parallel metallic end walls 1 and 2, and a transverse metallic central wall 3, all of which form an hermetically sealed envelope with cylindrical side walls 4 and 5 formed of a suitable ceramic. Fig. 1 represents an assembly prior to final manufacture while Fig. 2 represents the finished device. It will be appreciated that the construction shown is functionally similar to constructions known in the art where cylindrical glass walls are employed in the place of the ceramic walls 4 and 5.

For the purpose of forming a strong hermetic bond at the juncture where the walls 4 and 5 abut upon the metallic members 1, 2 and 3, the end surfaces of the walls 4 and 5 may be coated during the manufacturing operation with a thin preliminary coating of powdered iron, molybdenum, tungsten or nickel having a suitable quantity (preferably about 10% by weight) of powdered manganese mixed therewith. The selection of the former materials with which the manganese is mixed will be such as to match the thermal expansion coefficient of the metallized coating obtained after firing to those of the particular ceramic and the metal employed in the respective walls of the discharge device. While any of the metals mentioned and mixtures of them may be employed, the molybdenum and tungsten are particularly effective in combination with the manganese in producing a tightly adhering metal coating. The ceramic walls 4 and 5 with the preliminary coating are then fired at a suitable temperature and preferably in a reducing atmosphere until a strongly adherent metallic coating 6 on end and edge surfaces of walls 4 and 5 is obtained. For example, the assembly may be fired at about 1350° C. for about one-half hour in an atmosphere of hydrogen or in vacuum. It will be understood that the temperatures may be varied somewhat, and in general it may be said that an increase in time of heating will permit a slightly lower temperature to be employed.

It should be understood that the quantity of manganese employed may be varied through wide limits without departing from the scope of the invention. However, better results will be obtained if the quantity be minimized. For example, I have found it preferable to use a percentage quantity of the above order of magnitude.

In assembling the discharge device in its final form, there may be inserted between or adjacent the junctures of the walls 4 and 5 and the metallic walls 1, 2 and 3 a suitable solder such as the ring 7 which may be of silver, gold, copper or other metals. The solder may be positioned in any manner which permits it to flow between the surfaces when heated. Thus it may also be pressed up against the wall in the angle formed at their juncture. It will be understood that the respective parts will be assembled substantially in the position shown for the heating operation which is to complete the bonding of the members together. The assembly with its component members in substantially the position shown is then heated in a suitable atmosphere such as a reducing hydrogen atmosphere or in a vacuum to a temperature sufficient to melt the solder. It will be found convenient and preferable to carry out the latter step in a hydrogen furnace of the type conventional in present manufacturing processes although it may be accomplished in similar vacuum apparatus. For the purpose, any suitable method of heating may be used such as the method of heating by high frequency induction of electrical currents in the metallic portions of the device. Wherever the ceramic walls 4 and 5 have been metallized with the manganese composite metal, heat treated in the aforedescribed manner, the solder will be found too wet and firmly adhere to those walls and at the same time it will readily adhere to the metallic walls 1, 2 and 3.

It will be understood that it may be possible to carry out both the metallizing and solder operations simultaneously under some conditions. For example, if the particular metallic composite with manganese and the particular solder are such as may be handled at or near the same working temperature, it may be possible to cause both to flow uniformly over the abutting surfaces simultaneously.

As an example of a suitable ceramic material for the purpose of the above, I prefer to use the zirconium silicate or magnesium silicate bodies; however, due to the nature of the reaction, it may be assumed that other materials are satisfactory, providing that they are refractory enough to withstand the prescribed firing temperature. Such materials may be magnesium silicate, titanium dioxide, berryllium oxide, alumina and others. As an example of a suitable metallic composition for the walls 1, 2 and 3 there may be mentioned molybdenum or iron containing 16% to 30% chromium coated with copper or an alloy containing 54% iron, 28% nickel, 18% cobalt or certain nickel-iron alloys, depending upon the expansion coefficient of the ceramic selected. It will be understood that the materials in all parts of the device are so selected as to have substantially the same mean thermal coefficient of expansion.

It will be understood that the walls 1, 2 and 3 may serve as externally accessible electrodes for an anode 8, a cathode 9 and a grid 10, respectively, the cathode being provided with a suitable thermionic heater 11 for producing thermionic emission. The latter features constitute no part of the present invention and are disclosed and broadly claimed in United States Letters Patent 2,353,743, issued July 18, 1944, to Elmer D. McArthur.

In Fig. 3 there is shown an alternative embodiment of the invention comprising an hermetically sealed envelope consisting of disk-shaped ceramic end walls 12 and 13 and ceramic cylindrical side walls 14 and 15. The metallic anode 16 protrudes through the wall 12 into the chamber of the device while the cathode 17 protrudes similarly through the wall 13. A disk-shaped grid member 18 similar to that shown in Fig. 1 is supported between the walls 14 and 15. The walls 14 and 15 may be bonded to the walls 12 and 13, respectively, by first providing them with a metallic surface in substantially the same manner as heretofore discussed in connection with Fig. 1 and then soldering those metallized surfaces together. The metallic members comprising the cathode 17, the grid 18 and the anode 16 may be bonded to the ceramic structure at their respective points of contact by the process already discussed in connection with Fig. 1.

Fig. 4 illustrates a ceramic member with a metallized surface formed thereon. It comprises a central ceramic core 19 upon which layers 20 and 21 of molybdenum, tungsten, iron, or nickel have been formed by the manganese process of coating on the ceramics described above. Such a structure may, for example, be employed as a capacitor, the coatings 20 and 21 serving as the opposite electrodes thereof.

Because of the extremely high temperature softening characteristics of ceramics, it will be found that structures made by the foregoing process will maintain their alignment and accuracy at very high temperatures and, moreover, the device may be heated to very high temperatures without danger of the walls collapsing under the force of external air pressure.

While I have shown and described particular embodiments of my invention, it will be obvious to those skilled in the art that various changes and modifications may be made without departing from the invention in its broader aspects and I, therefore, aim in the appended claims to cover all such changes and modifications as fall within the true spirit and scope of the invention.

What I claim as new and desire to secure by Letters Patent of the United States is:

1. A metallized ceramic comprising a ceramic member having a tightly adhering metal surface thereon comprising manganese and a metal selected from the group consisting of molybdenum, tungsten, iron, nickel, and mixtures thereof, said manganese constituting a substantial percentage by weight of said metal surface and a portion of the manganese being combined with said ceramic to form a tightly adhering coating.

2. A metallized ceramic comprising a ceramic member having a tightly adhering metal surface thereon comprising manganese and molybdenum, said manganese constituting a substantial percentage by weight of said metal surface and a portion of the manganese being combined with said ceramic to form a tightly adhering coating.

HENRY J. NOLTE.

References Cited in the file of this patent

UNITED STATES PATENTS

| Number | Name | Date |
|---|---|---|
| 1,852,093 | Smede et al. | Apr. 5, 1932 |
| 1,871,371 | Jackson | Aug. 9, 1932 |
| 2,141,677 | Ziegenbein | Dec. 27, 1938 |
| 2,163,407 | Pulfrich | June 20, 1939 |
| 2,163,410 | Pulfrich et al. | June 20, 1939 |
| 2,250,986 | Dobke | July 29, 1941 |
| 2,282,106 | Underwood | May 5, 1942 |
| 2,394,919 | Kingston | Feb. 12, 1946 |
| 2,555,877 | Doran | June 5, 1951 |

FOREIGN PATENTS

| Number | Country | Date |
|---|---|---|
| 502,273 | Great Britain | Mar. 15, 1939 |